(12) United States Patent
Cattaneo et al.

(10) Patent No.: US 8,870,082 B2
(45) Date of Patent: Oct. 28, 2014

(54) TEMPERATURE-SENSITIVE LABEL

(75) Inventors: Lorena Cattaneo, Busto Arsizio (IT); Francesco Butera, Como (IT); Stefano Alacqua, Como (IT)

(73) Assignee: SAES Getters S.p.A., Lainate (MI) (IT)

( * ) Notice: Subject to any disclaimer, the term of this patent is extended or adjusted under 35 U.S.C. 154(b) by 0 days.

(21) Appl. No.: 14/005,227

(22) PCT Filed: Mar. 21, 2012

(86) PCT No.: PCT/IB2012/051345
§ 371 (c)(1),
(2), (4) Date: Sep. 13, 2013

(87) PCT Pub. No.: WO2012/131538
PCT Pub. Date: Oct. 4, 2012

(65) Prior Publication Data
US 2014/0001273 A1  Jan. 2, 2014

(30) Foreign Application Priority Data

Mar. 29, 2011 (IT) .............................. MI2011A0499

(51) Int. Cl.
| | | |
|---|---|---|
| *G06K 19/06* | (2006.01) | |
| *G06K 19/077* | (2006.01) | |
| *G01K 3/04* | (2006.01) | |
| *G01K 5/48* | (2006.01) | |

(52) U.S. Cl.
CPC ............ *G06K 19/07749* (2013.01); *G01K 3/04* (2013.01); *G01K 5/483* (2013.01)
USPC .......................................... 235/492; 235/453

(58) Field of Classification Search
CPC ... G01K 5/00; G01K 11/00; G01K 19/07749; G01K 5/483; G01K 19/06
USPC ................................... 235/492, 453
See application file for complete search history.

(56) References Cited

U.S. PATENT DOCUMENTS 3,483,752 A * 12/1969 Hill et al. ...................... 116/216
(Continued)

FOREIGN PATENT DOCUMENTS

WO          00/50849        8/2000

OTHER PUBLICATIONS

PCT International Preliminary Report on Patentability mailed on May 21, 2013 for PCT application PCT/IB2012/051345 filed on Mar. 21, 2012 in the name of Saes Getters S.p.A.

(Continued)

*Primary Examiner* — Daniel St Cyr
(74) *Attorney, Agent, or Firm* — Steinfl & Bruno LLP

(57) ABSTRACT

A temperature-sensitive label is described. The temperature-sensitive label has a container provided with means for the application on an item to be monitored and housing a temperature-sensitive system made up of a filiform shape memory member. The filiform shape memory member is restrained to a filiform bias member provided with an engaging seat, and is introduced in such a way that in case of exposure to a temperature lower than a preset critical threshold temperature ($T_c$), the filiform shape memory member performs a phase transition, causing an irreversible disengagement condition visible through a transparent window.

12 Claims, 3 Drawing Sheets

(56) References Cited

U.S. PATENT DOCUMENTS

| | | | |
|---|---|---|---|
| 3,516,082 A * | 6/1970 | Cooper | 340/593 |
| 4,114,559 A * | 9/1978 | Rogen | 116/216 |
| 6,837,620 B2 | 1/2005 | Shahinpoor | |
| 6,848,390 B2 | 2/2005 | Akers et al. | |
| 2003/0188677 A1 | 10/2003 | Akers et al. | |
| 2004/0120384 A1 | 6/2004 | Shahinpoor | |
| 2009/0120106 A1 | 5/2009 | Chin | |

OTHER PUBLICATIONS

PCT Written Opinion of the International Preliminary Examining Authority mailed on Mar. 4, 2013 for PCT application PCT/IB2012/051345 filed on Mar. 21, 2012 in the name of Saes Getters S.p.A.

PCT International Search Report mailed on Jun. 27, 2012 for PCT application PCT/IB2012/051345 filed on Mar. 21, 2012 in the name of Saes Getters S.p.A.

\* cited by examiner

TEMPERATURE-SENSITIVE LABEL

CROSS REFERENCE TO RELATED APPLICATIONS

The present application is the US national stage of International Patent Application PCT/IB2012/051345 filed on Mar. 21, 2012 which, in turn, claims priority to Italian Patent Application MI2011A000499 filed on Mar. 29, 2011.

The present invention relates, in a first aspect thereof, to a temperature-sensitive label capable of indicating whether the item on which it is applied was exposed, even only for a short period of time, to a temperature below a minimum temperature threshold.

BACKGROUND

In the pharmaceutical field there is the known need of a constant and precise monitoring of the storage and transport conditions of medicines, which allows to guarantee that they are not modified in their chemical and physical characteristics and are therefore capable of preserving their functional properties and cannot provoke possible undesired side effects when performing their therapeutical activity.

Medicines, with particular reference to those packaged in bottles or small vials, are generally stored in boxes which in turn are gathered in groups, for example on pallets. These pallets are usually transported from the manufacturing site to the distribution center located in the destination area, where the pallet is divided into the various boxes or single bottles so as to allow the delivery to the client, in this specific case for example hospitals, pharmacies, etc.

It is therefore particularly important that each bottle is controlled as to the risk of exposure to undesired temperatures. For many medicines it is fundamental that they are not exposed to a temperature below a minimum temperature threshold, same as a maximum temperature not to be exceeded during their whole commercial life, in that a freezing thereof would however have undesired effects on their therapeutical capacity. The typical suitable range for the storage of said products is in fact considered to be between the temperatures of 2° C. and 8° C.

This problem of controlling the temperature during the storage and transport of the products is not however limited to the pharmaceutical field. Other fields interested in that can be, for example, food, biotechnologies, botanics, chemistry.

Although various technical solutions have already been developed to monitor the exceeding of a maximum temperature threshold in an effective and timely manner, this problem has not yet been adequately solved as far as a minimum threshold is concerned.

It is of particular interest to find a solution suitable for application on single items, even of small size, without particular limitations caused by the shape of the item whose temperature is to be monitored. In other words, the problem could be effectively solved by developing a sensitive member in the form of a label, i.e. a member of small bulkiness as well as adaptable to various surfaces, possibly also not flat, of the item on which it will be applied.

Moreover, most of the distribution system bases its efficiency on the use of devices capable of monitoring the product to be moved during its whole life and, if possible, in real time and from remote. Such a monitoring, in general, is based on the use of radio-frequency devices applicable on different items, commonly known in the field as RFID labels (from Radio Frequency IDentification). It is therefore particularly advantageous that the solution for monitoring a possible minimum temperature threshold could be integrated with this type of system.

U.S. Pat. No. 6,848,390 discloses a device that allows the monitoring of the exposure to temperatures above the desired temperature. Its operation is based on a member made from a shape memory alloy, selected among those known in the field also as SMA (from Shape Memory Alloy), that acts as a member capable of responding to temperature in combination with a member capable of exerting a load function (indicated in the field by the term "bias"). Said SMA member acts as a mobile member for displaying the exposure to temperatures above the desired temperature.

However this device not only does not allow to monitor the possible exposure to temperatures below the desired temperature, but it also requires a complicated calibration process that must allow to control the thermal conductivity towards the SMA member, providing for the inside of the sensitive device to be maintained under vacuum conditions or, alternatively, to be filled with a thermally insulating fluid. This latter feature, however, implies a slow response of the device, thus rendering it unsuitable for the instantaneous monitoring of undesired temperatures. Moreover, the need to maintain vacuum or fluid containment makes quite difficult to scale down said device to a "label" type format and makes unpractical its mass manufacturing.

A different solution is disclosed in U.S. Pat. No. 6,837,620 showing a sensor suitable to indicate the exposure, even temporarily, to temperatures below a preset critical temperature. It exploits the transition from the austenitic phase to the martensitic phase of a SMA wire associated with a bias, that can be either a spring or another resilient member. Said resilient member, which is the bias applied to the SMA wire, is also described as being capable of assuring the non-return of the sensitive member to its starting position, thus allowing to maintain the indication of the occurrence of the undesired event even when the temperature has returned to acceptable values.

However also in this case there are disclosed solutions that are difficult to adapt to configurations of the "label" type in addition to being difficult to integrate with RFID monitoring techniques and, especially, unsuitable in view of a large scale use. In fact, one of the proposed embodiments provides the use of a spring as bias member with consequent limitations in terms of miniaturisation of the system, whereas the second embodiment presents a system for moving the visual display member that would not be suitable, without substantial modifications, to be put into communication with a control microprocessor suitable for remote monitoring.

The use of shape memory members as sensitive members is disclosed also in the US patent application 2009/0120106. However in this case the visual display system refers only to the exceeding of maximum temperature thresholds. Moreover, although it is described in one of its embodiments as a system that can be integrated with RFID systems, its production appears to be quite complicated in that it is based on aspects of electromagnetic shielding performed by the system between a RFID label and a receiving member (known in the field by the term "antenna") associated therewith.

Finally, the international patent application WO 00/50849 although generically disclosing the possibility of use of shape memory members as sensitive members inside devices for remote monitoring, does not describe nor provide any teaching about how to achieve the above-mentioned integration. Moreover, said use does not stand out as preferred with respect to the multitude of solutions presented as potentially useful for sensoring purposes and described in the specification, which result all substantially equivalent within the wide and varied range of possibilities.

The present invention allows to overcome the limits of the prior art to obtain temperature-sensitive labels capable of visually displaying the exposure to temperatures below a threshold temperature $T_c$ set as critical and that can optionally be integrated with remote monitoring systems.

SUMMARY

In order to achieve said object the invention consists of a label comprising at least one temperature-sensitive system made up of a filiform shape memory member restrained to a filiform bias member provided with an engaging seat preferably formed by bending back the filiform bias member, one of the ends of the filiform shape memory member being introduced in said engaging seat in such a way that in case of exposure to a temperature lower than the critical threshold temperature $T_c$ the shape memory member performs a phase transition, from austenitic phase to martensitic phase, which reduces its strength and causes its irreversible disengagement from the restraint.

In the following, labels will be explicitly described which include only one temperature-sensitive system comprising a pair of functional members, consisting of a shape memory member and a bias member with a respective restraint, yet it is clear that what is being said is also applicable to labels including a greater number of temperature-sensitive systems that therefore allow to perform an alert function not only with respect to a single minimum threshold critical temperature, but with respect to more different temperatures that can be critical depending on the specificity of the product to be monitored on which the label is applied.

Furthermore, it is obvious that the engaging seat could be formed also as a separate member, such as a small ring or the like, secured on the shape memory member or on the bias member but the simple bending of the end of the bias member is the cheapest solution.

BRIEF DESCRIPTION OF THE DRAWINGS

The invention will be described in detail hereafter through some embodiments thereof, provided as non-limiting examples, with reference to the following figures.

DETAILED DESCRIPTION

Figure 1A:
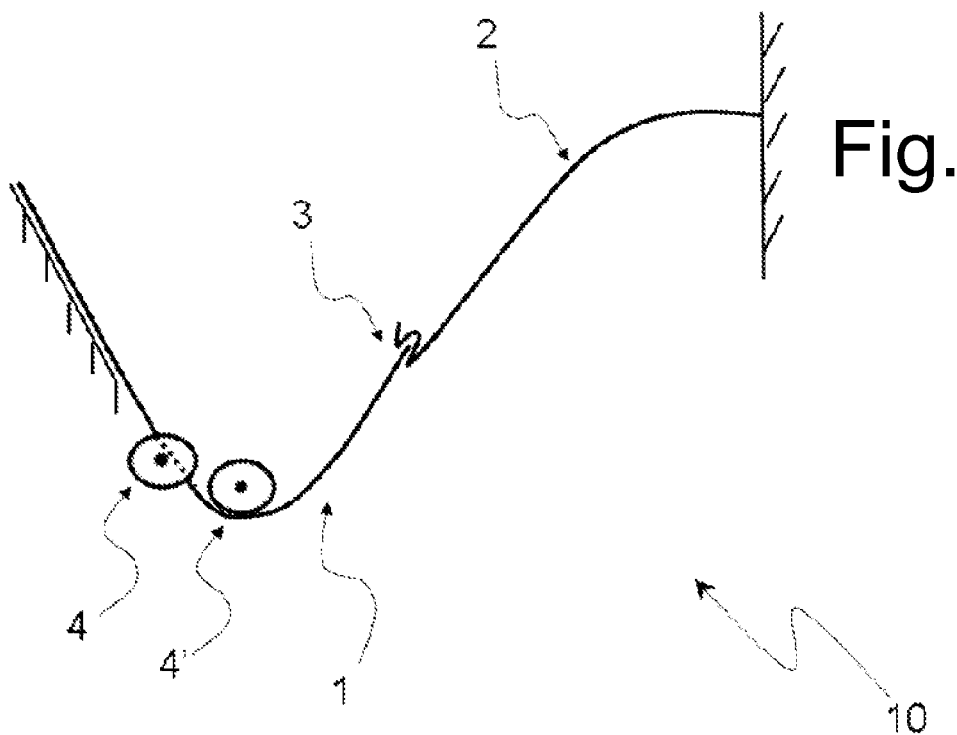
FIG. 1a depicts in a schematic way the temperature-sensitive system consisting of a shape memory member and a bias member restrained thereto according to the present invention.
Figure 1B:
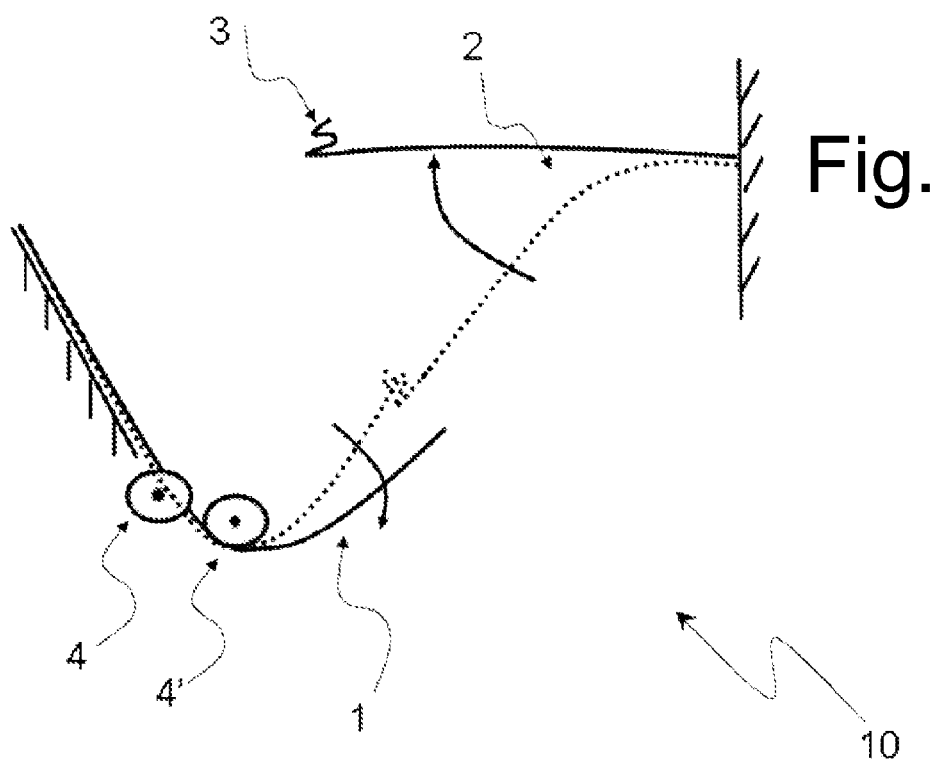
FIG. 1b depicts in a schematic way the spatial movement of the members making up the system of FIG. 1a after the exposure to temperatures below the critical threshold temperature.

Referring first to FIGS. 1a and 1b, there is seen that the invention essentially consists of a temperature-sensitive system 10 comprising a shape memory member 1, preferably a SMA wire, restrained to a filiform bias member 2 bent at the end placed in contact with said shape memory member so as to form an engaging seat 3 in which the shape memory member can be restrained. The latter is in what is commonly known in the field as austenitic phase, such that it is under tension so as to counterbalance the force exerted by the bias member 2.

The presence of an engaging seat formed in the bias member allows for stabler and more reproducible operation of the temperature sensitive label, since it improves the bias holding function of the shape memory alloy member. This is of particular relevance in the preferred embodiment where both the bias member and the shape memory alloy member are in the form of a wire, since in said case the absence of a seat would result in a tensioned contact over only a small lateral width between the members. With such a type of contact there is the risk of an unwanted triggering of the label due to small lateral displacement of the wires (bias and/or SMA), for example as a consequence of vibrations or other mechanically induced effects, rather than due to a temperature decrease below the monitored threshold, which is the purpose and function of the label.

By "engaging seat" it is intended any seat or housing formed by the bias wire itself which is capable to allocate and engage the shape alloy member, not restrained by any particular shape or depth. The holding function is achieved by suitably bending the bias itself thus creating a seat/housing suitable to allocate the end portion of the SMA member. As described before, this solution allows to obtain simpler and more reproducible labels and to avoid false triggering due to geometrical displacements caused by external mechanical stresses, an issue that is of particular relevance in the case of miniaturized labels.

The contact restraint between members 1, 2 is guaranteed, at temperature conditions above the critical threshold temperature $T_c$, preferably by a bending of the bias member 2 that forms an engaging seat 3 at the end affected by the coupling with the SMA member. Optionally, it is possible to provide for the SMA member to be positioned through some guide members 4, 4', etc. which better allow its introduction into the label that will receive the temperature-sensitive system consisting of the shape memory member 1 and the bias member 2.

As shown in FIG. 1b, when exposed to a temperature below the critical threshold temperature $T_c$, even temporarily, the shape memory member 1 goes from the austenitic phase to that which is known as martensitic phase and, as a consequence, its resistance decreases causing its disengagement from the restraint consisting of seat 3 formed by the bending (or other element) located at the end of the bias member 2. The two members 1 and 2 are therefore free to irreversibly take their final position which resides in the absence of contact, i.e. a different spatial arrangement thereof.

Figure 2A:
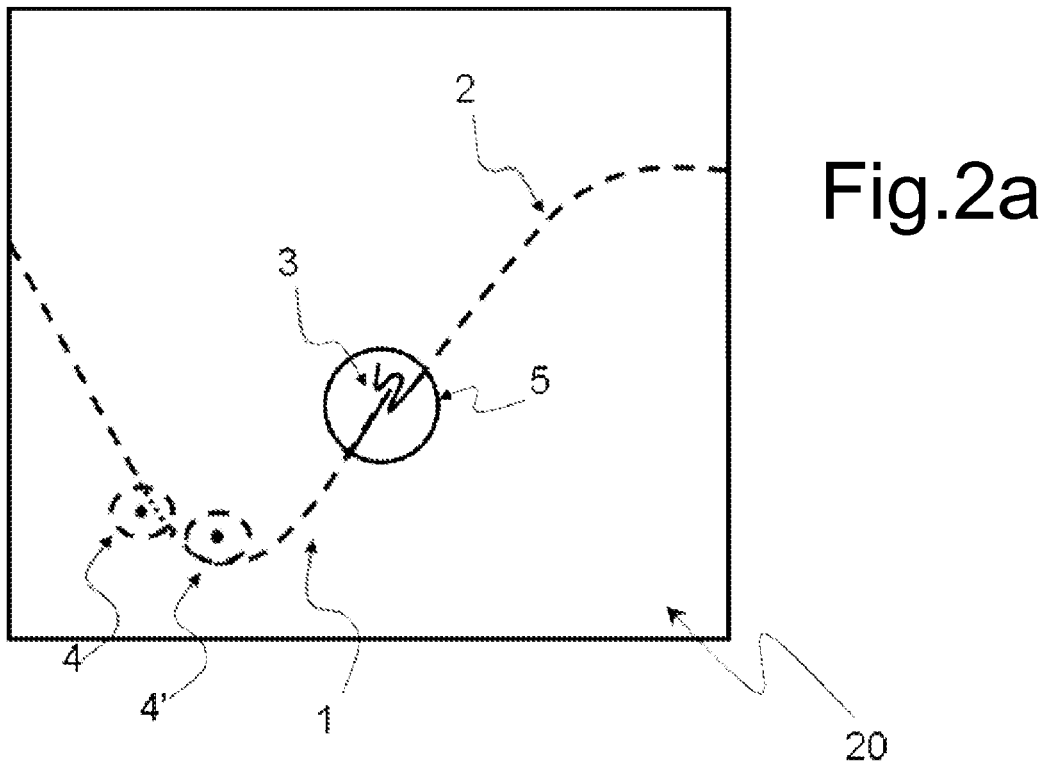
FIG. 2a depicts in a schematic way a first embodiment of a label according to the present invention, containing the temperature-sensitive system of FIG. 1a, in its original state.

FIG. 2a shows a first embodiment of a label 20 comprising the above-mentioned temperature-sensitive system illustrated in FIGS. 1a and 1b that is introduced inside a container provided with means for the application to an item to be monitored, typically a rear adhesive surface, and preferably flexible enough to adapt to items of different shapes while retaining an internal free volume sufficient to allow the movement of members 1 and 2.

Figure 2B:
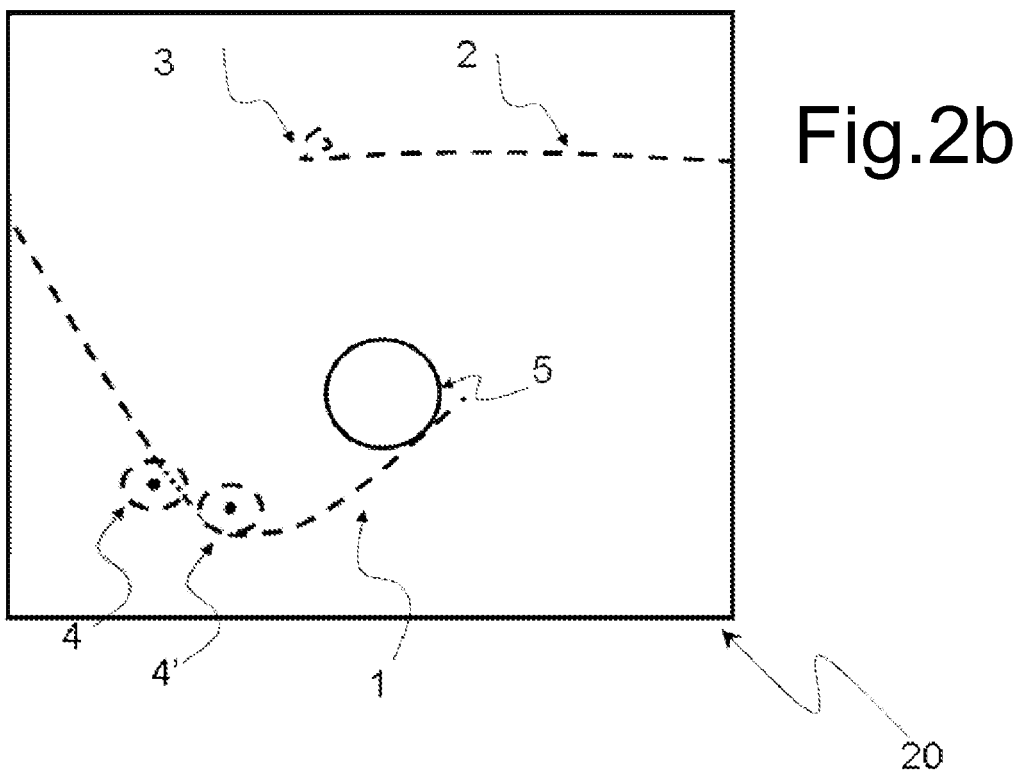
FIG. 2b depicts the label of FIG. 2a after the exposure to temperatures below the critical threshold temperature.

Said label structure performs a function of containment of the temperature-sensitive system as well as a function of visual display through the arrangement of a suitable transparent window 5 on its surface at the restraint of the temperature-sensitive system. Since said window 5 is formed at the original position of engaging seat 3 that achieves the engagement between the shape memory member 1 and the bias member 2, it allows to correlate the visibility of said engaging seat 3 with the maintenance of the temperature above the critical threshold $T_c$ and therefore with the absence of phase transition of the shape memory member 1. On the contrary, when said transition occurs members 1, 2 take the positions illustrated in FIG. 1b and are therefore no longer visible through window 5, as shown in FIG. 2b.

Figure 3:
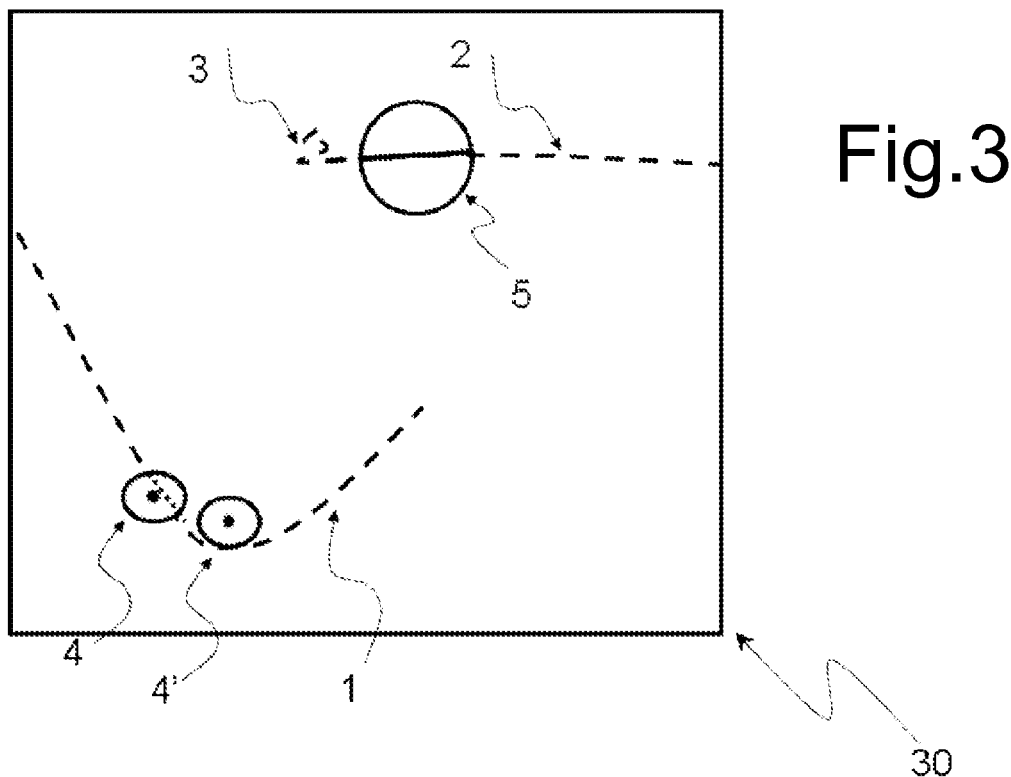
FIG. 3 depicts a second embodiment of a label according to the present invention after the exposure to temperatures below the critical threshold temperature.
Figure 4:
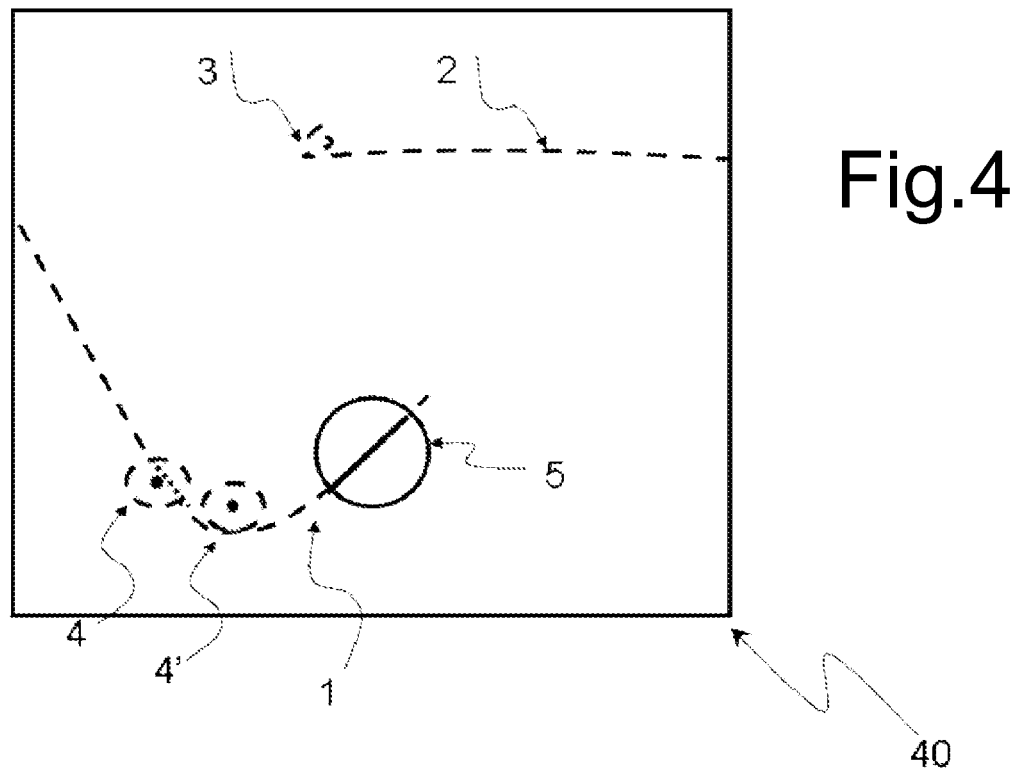
FIG. 4 depicts a third embodiment of a label according to the present invention after the exposure to temperatures below the critical threshold temperature.

Vice versa, as shown in FIGS. 3 and 4, it is possible to provide other embodiments of the label according to the present invention in which the arrangement of window 5 is at the disengagement position of one of the two members 1, 2 which is reached due to the phase transition caused by the exposure to a temperature below the critical threshold temperature $T_c$. Specifically, in the second embodiment of FIG. 3 label 30 is provided with window 5 arranged at the disengagement position of the bias member 2, whereas in the third embodiment of FIG. 4 label 40 is provided with window 5 arranged at the disengagement position of the shape memory member 1 (obviously the label can even be provided with two windows 5 at both said disengagement positions).

In this case therefore the visibility of member 1 and/or 2 corresponds, differently from the previous embodiment, to an alert situation for the person responsible for the transport of the monitored item as well as for the final user to whom it is addressed. In both embodiments it is possible to provide other display means through the use of suitable indicating members (e.g. colored members) in structural variants that allow to display the safety or alert state for the monitored item, i.e. the actual maintenance of the temperature above the critical threshold $T_c$ or the lack of maintenance of said condition.

The invention provides, in its preferred embodiment, that the shape memory member is made of a shape memory alloy selected among common shape memory alloys, among which particularly preferred are the nickel- and titanium-based alloys commonly known as Nitinol. As to the dimensional characteristics, it is preferred to use wires with a length between 1 and 30 mm, preferably between 2 and 20 mm. Moreover, the diameter of said SMA wire is preferably comprised between 25 and 500 µm. The bias member 2 is instead preferably made with a wire having a length between 4 and 30 mm, preferably between 4 and 20 mm, and having a diameter preferably comprised between 25 and 500 µm.

The label according to the invention can be easily integrated with RFID systems when the SMA member and the bias member are made of an electrically conductive material. In fact in said case their ends not affected by their mutual restraint and positioned at the periphery of the label can be used as electrical contacts to close a branch of an electric circuit connected to the RFID system, providing a signal that can be managed and interpreted by an integrated microcircuit (microchip).

In the safety state, i.e. until when the temperature remains above the critical threshold $T_c$, the microcircuit is characterized by the electrical closure of the circuit branch comprising the SMA member and the bias member that will result arranged in series. On the contrary, whenever an exposure to a temperature below said threshold should occur, this circuit will open providing in real time the information about the alert state to the microcircuit to which said electrical branch is connected.

It should be noted that the electrical contacts arranged in the peripheral region of the label and integrable with the integrated microcircuit can be made of a conductive material different from that making up the SMA and/or bias member, allowing to achieve said integration through conventional techniques useful for the purpose, such as for example welding or crimping.

In a second aspect thereof, the invention includes a RFID microcircuit in which a temperature-sensitive label as described above is integrated through electrical contacts.

The invention claimed is:

1. A temperature-sensitive label comprising:
a container provided with means for an application on an item to be monitored, wherein:
said container houses at least one temperature-sensitive system made up of a filiform shape memory member restrained to a filiform bias member, and
said filiform bias member is provided with an engaging seat, formed by bending the filiform bias member back at one of the ends of the filiform bias member, in which one of the ends of said filiform shape memory member is introduced in such a way that in case of exposure to a temperature lower than a preset critical threshold temperature ($T_c$), the filiform shape memory member performs a phase transition, from austenitic phase to martensitic phase, which causes irreversible disengagement of the filiform shape memory member from the restraint formed by said engaging seat,
the temperature-sensitive label further comprising displaying configured to display said irreversible disengagement.

2. The temperature-sensitive label according to claim 1, wherein said filiform shape memory member consists of a shape memory alloy wire.

3. The temperature-sensitive label according to claim 1, wherein said filiform shape memory member has a length between 1 mm and 30 mm.

4. The temperature-sensitive label according to claim 3, wherein said filiform shape memory member has a length between 2 mm and 20 mm.

5. The temperature-sensitive label according to claim 1, wherein said filiform shape memory member and said filiform bias member are made of an electrically conductive material.

6. The temperature-sensitive label according to claim 1, wherein said filiform bias member has a length between 4 mm and 30 mm.

7. The temperature-sensitive label according to claim 6, wherein said filiform bias member has a length between 4 mm and 20 mm.

8. The temperature-sensitive label according to claim 1, wherein said filiform shape memory member and/or said filiform bias member has a diameter between 25 m and 500 m.

9. The temperature-sensitive label according to claim 1, wherein the displaying means consist of a transparent window formed in the container at a position taken by the engaging seat corresponding to when the two filiform members are mutually restrained.

10. The temperature-sensitive label according to claim 1, wherein the displaying means consist of at least one transparent window formed in the container at the disengagement position reached by one of the two filiform members upon the phase transition of the filiform shape memory member.

11. The temperature-sensitive label according to claim 1, wherein the container houses a plurality of temperature-sensitive systems and is provided with a plurality of displaying means suitable to respectively display the condition of each of said temperature-sensitive systems.

12. A circuital arrangement comprising:
an RFID microcircuit, and
a temperature-sensitive label comprising,
- a container provided with means for an application on an item to be monitored, wherein:
  - said container houses at least one temperature-sensitive system made up of a filiform shape memory member restrained to a filiform bias member, and
  - said filiform bias member is provided with an engaging seat, formed by bending the filiform bias member back at one of the ends of the filiform bias member, in which one of the ends of said filiform shape memory member is introduced in such a way that in case of exposure to a temperature lower than a preset critical threshold temperature ($T_c$), the filiform shape memory member performs a phase transition, from austenitic phase to martensitic phase which causes irreversible disengagement of the filiform shape memory member from the restraint formed by said engaging seat,
- the temperature-sensitive label further comprising displaying configured to display said irreversible disengagement, wherein the temperature-sensitive label is integrated with the RFID microcircuit via electrical contacts.

* * * * *